(12) United States Patent
Küchen et al.

(10) Patent No.: US 7,581,682 B2
(45) Date of Patent: Sep. 1, 2009

(54) IMAGE-RECORDING DEVICE, METHOD FOR RECORDING AN IMAGE THAT IS VISUALIZED ON A DISPLAY UNIT, ARRANGEMENT OF AN IMAGE-RECORDING DEVICE AND A DISPLAY UNIT, USE OF SAID IMAGE-RECORDING DEVICE, AND USE OF SAID ARRANGEMENT

(75) Inventors: Jörg Küchen, Würselen (DE); Frank Müller, Aachen (DE); Laurens Nunnink, BT Simpelveld (NL)

(73) Assignee: Gavitec AG, Würselen (DE)

( * ) Notice: Subject to any disclaimer, the term of this patent is extended or adjusted under 35 U.S.C. 154(b) by 338 days.

(21) Appl. No.: 10/521,510

(22) PCT Filed: Jul. 16, 2003

(86) PCT No.: PCT/DE03/02367

§ 371 (c)(1),
(2), (4) Date: Jan. 18, 2005

(87) PCT Pub. No.: WO2004/017624

PCT Pub. Date: Feb. 26, 2004

(65) Prior Publication Data
US 2005/0270358 A1    Dec. 8, 2005

(30) Foreign Application Priority Data
Jul. 19, 2002  (DE) .............................. 102 33 060
Nov. 19, 2002  (DE) .............................. 102 54 060

(51) Int. Cl.
G06K 7/10    (2006.01)
(52) U.S. Cl. ............. 235/473; 235/462.41; 235/462.32; 235/454; 235/462.24; 235/470

(58) Field of Classification Search ............ 235/462.24, 235/462.41, 462.32
See application file for complete search history.

(56) References Cited

U.S. PATENT DOCUMENTS

| 4,950,072 | A | * | 8/1990 | Honda ........................ 353/122 |
| 5,256,866 | A | * | 10/1993 | Conversano et al. ... 235/472.03 |
| 5,789,732 | A | | 8/1998 | McQueen et al. |
| 5,850,078 | A | * | 12/1998 | Giordano et al. ....... 235/462.27 |
| 5,947,577 | A | | 9/1999 | Jikihara et al. |
| 6,036,095 | A | | 3/2000 | Seo |
| 6,066,857 | A | * | 5/2000 | Fantone et al. ............... 250/566 |
| 2001/0012001 | A1 | * | 8/2001 | Rekimoto et al. ........... 345/173 |
| 2002/0168085 | A1 | * | 11/2002 | Reed et al. .................. 382/100 |

FOREIGN PATENT DOCUMENTS

| DE | 199 09 989 | 9/2000 |
| EP | 0 984 319 | 3/2000 |

(Continued)

*Primary Examiner*—Michael G Lee
*Assistant Examiner*—Kristy A Haupt
(74) *Attorney, Agent, or Firm*—Collard & Roe, P.C.

(57) ABSTRACT

To improve image capture from a display or a surface, more specifically from a specular reflecting surface, the invention proposes an image capturing apparatus having an image capturing unit and an image fitting surface in which the optical axis of the image capturing unit is disposed at an angle α to a normal of the image fitting surface.

22 Claims, 6 Drawing Sheets

FOREIGN PATENT DOCUMENTS

Figure 9:
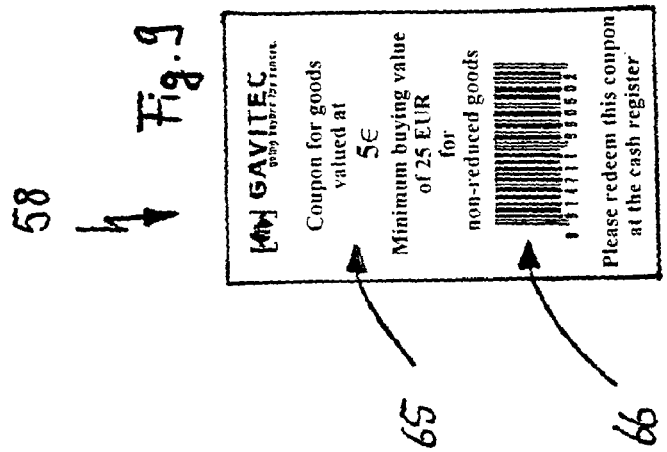

| | | |
|---|---|---|
| JP | 5-342494 | 12/1993 |
| JP | 9-321926 | 12/1997 |
| JP | 2002-117458 | 4/2002 |
| JP | 2002-207959 | 7/2002 |
| WO | WO02/31749 | 4/2002 |

* cited by examiner

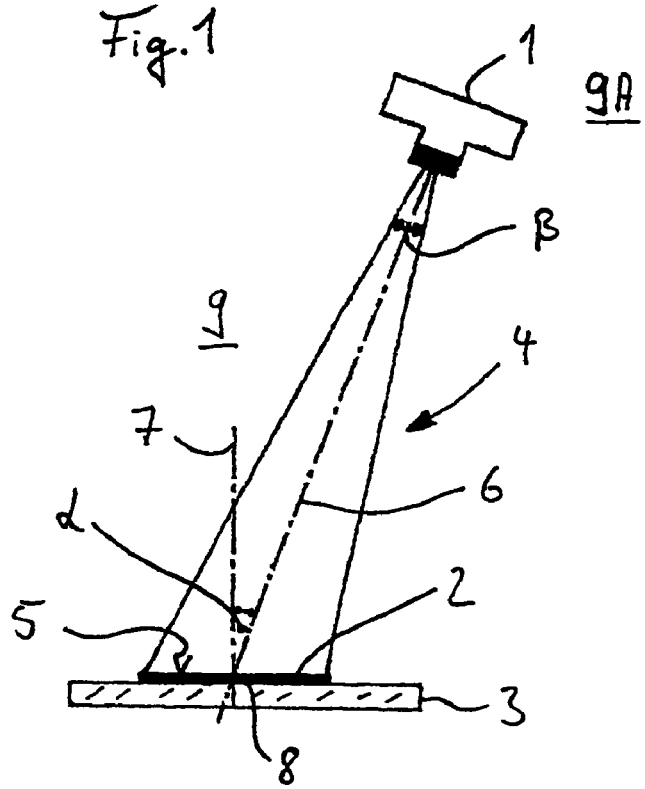
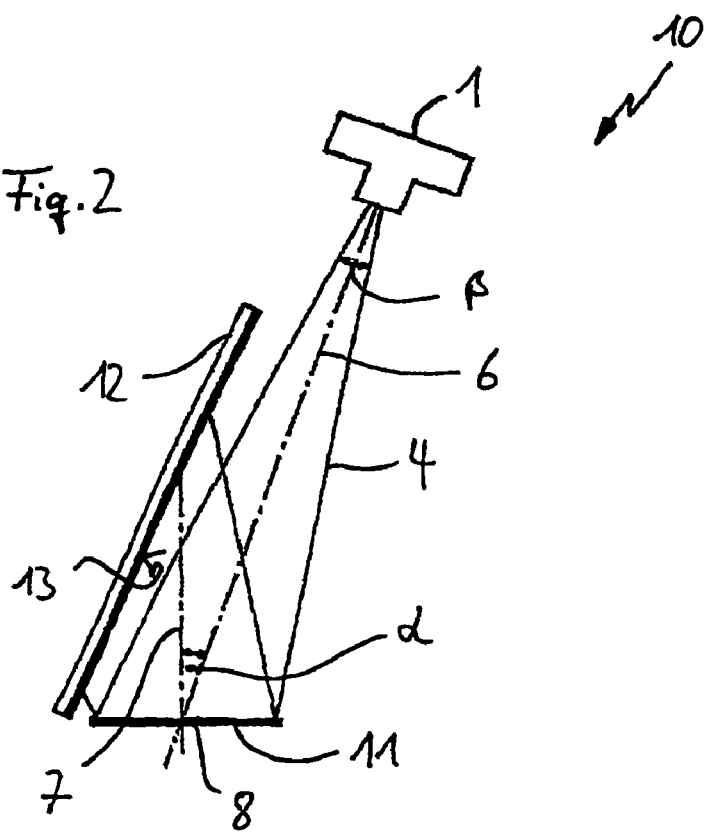

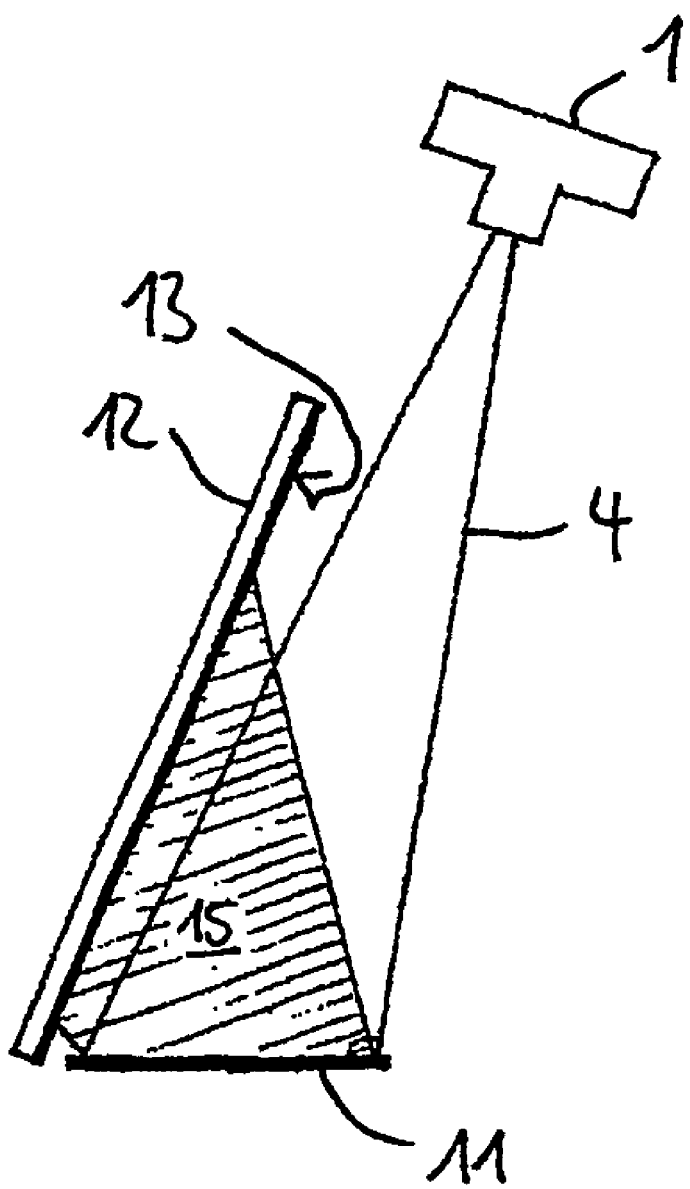

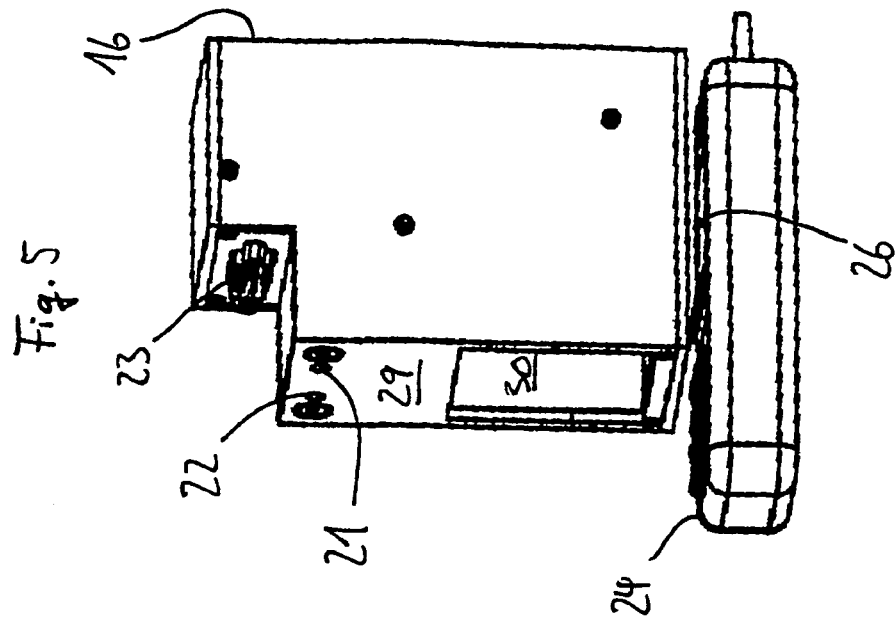
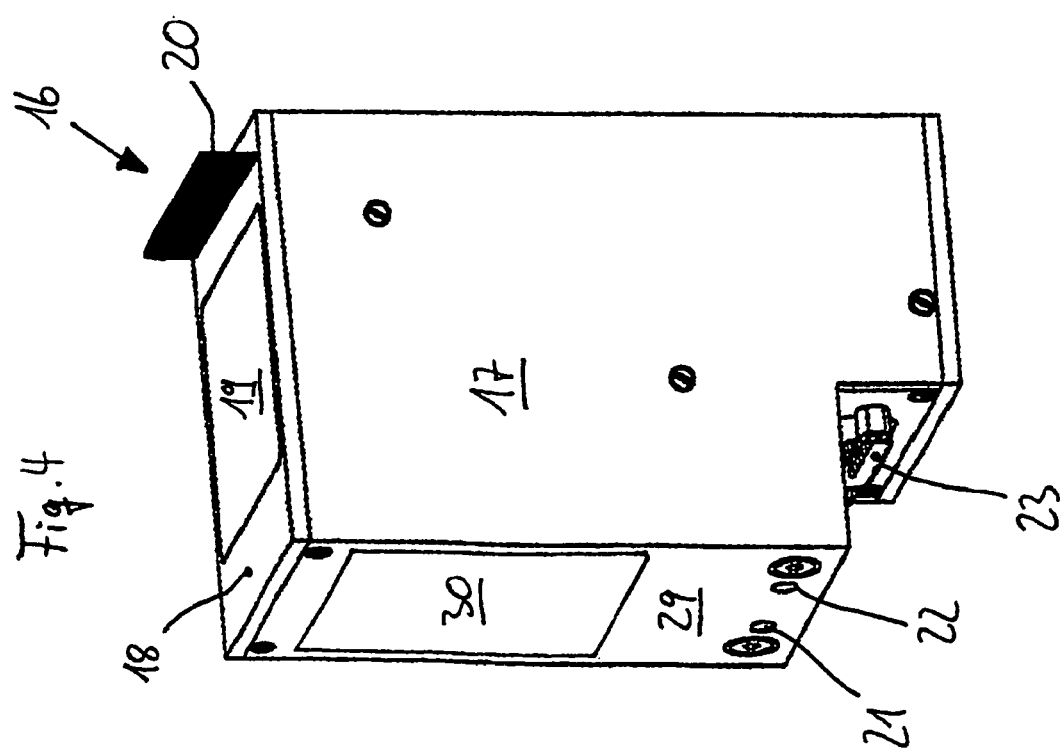

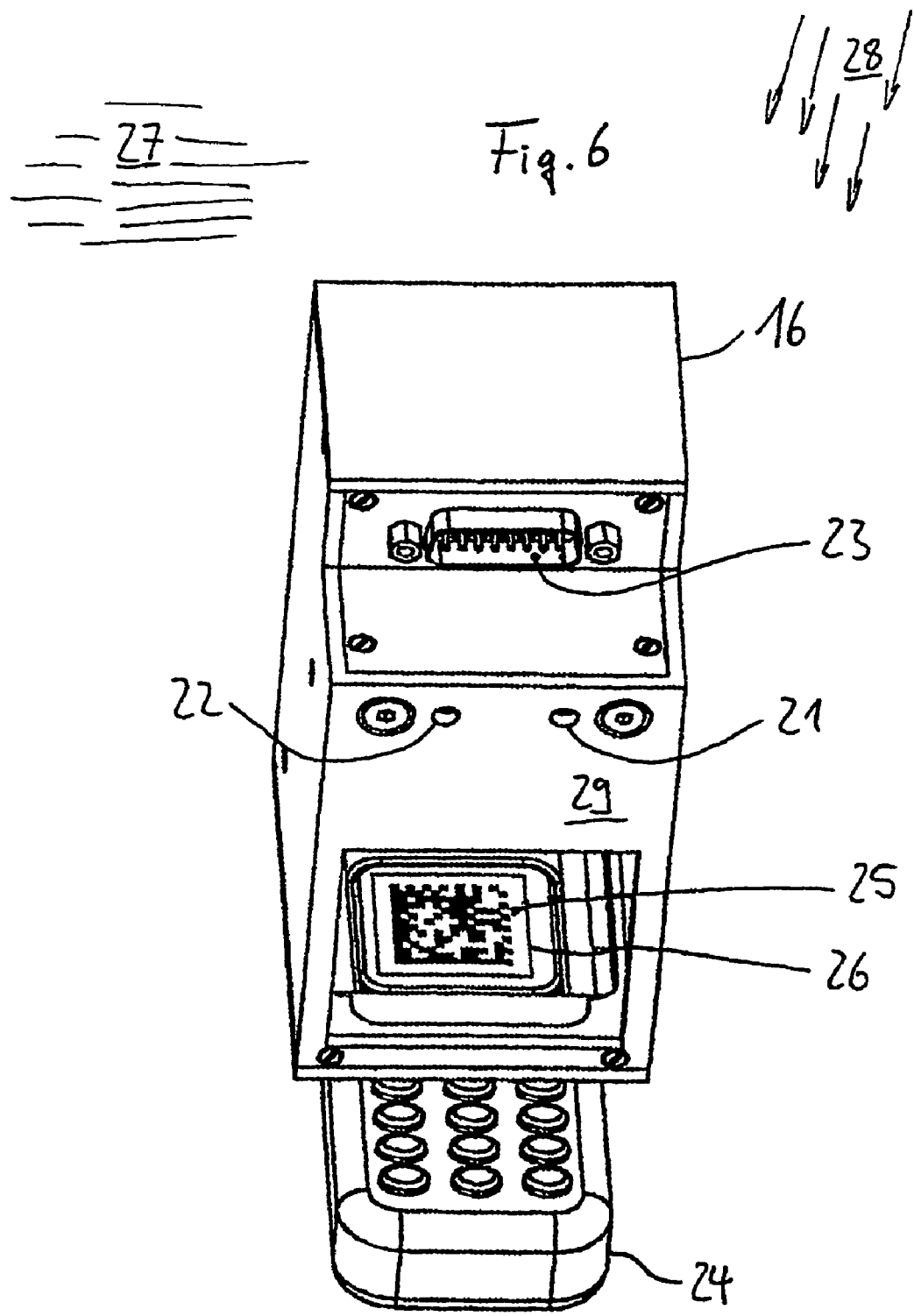

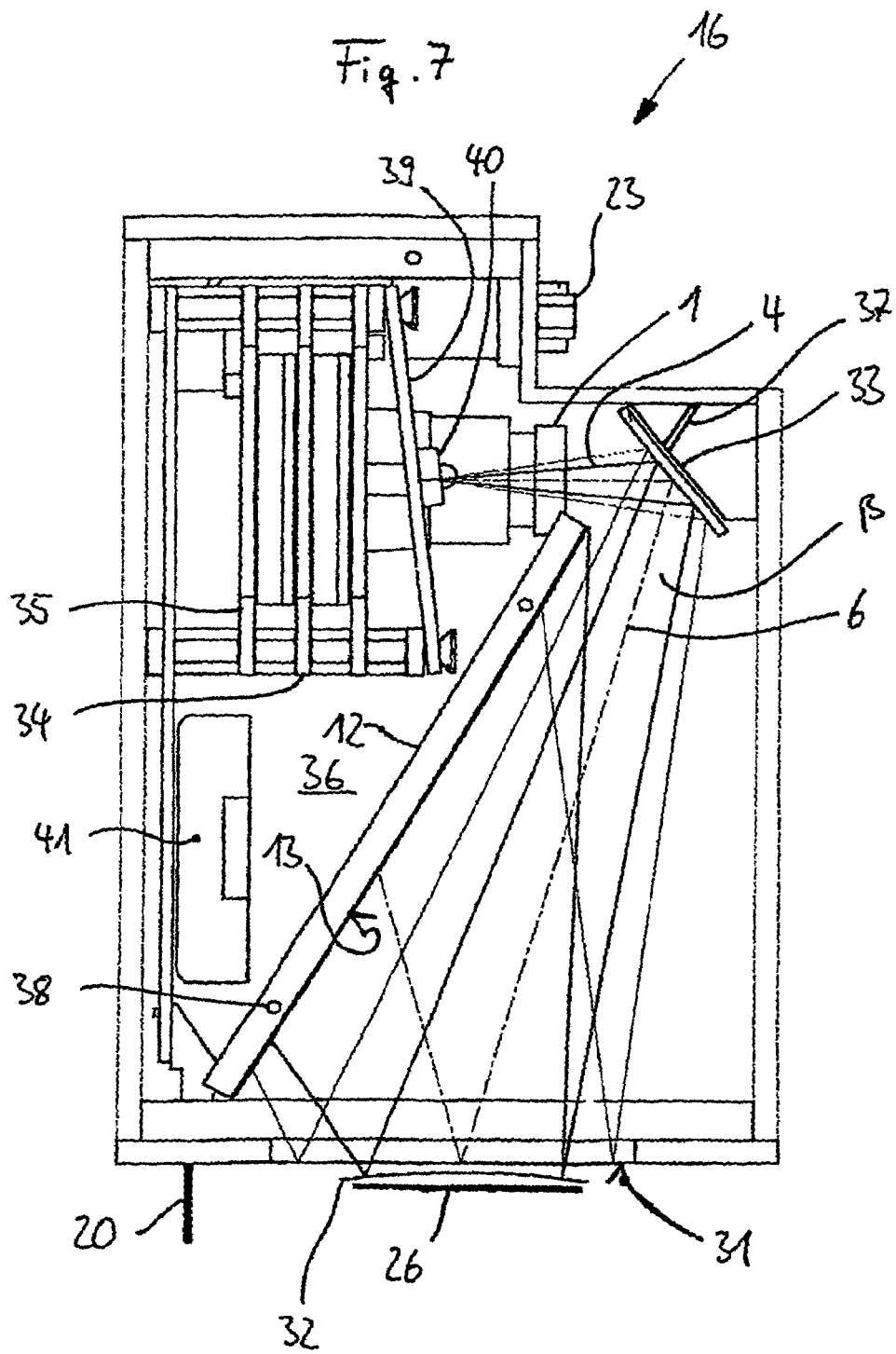

IMAGE-RECORDING DEVICE, METHOD FOR RECORDING AN IMAGE THAT IS VISUALIZED ON A DISPLAY UNIT, ARRANGEMENT OF AN IMAGE-RECORDING DEVICE AND A DISPLAY UNIT, USE OF SAID IMAGE-RECORDING DEVICE, AND USE OF SAID ARRANGEMENT

CROSS REFERENCE TO RELATED APPLICATIONS

Applicants claim priority under 35 U.S.C. §119 of German Application Nos. 102 33 060.3 and 102 54 060.8 filed Jul. 19, 2002 and Nov. 19, 2002, respectively. Applicants also claim priority under 35 U.S.C. §365 of PCT/DE2003/002367 filed Jul. 16, 2003. The international application under PCT article 21(2) was not published in English.

The invention relates on the one hand to an image capturing apparatus with an image capturing unit and an image fitting surface. On the other hand, the invention relates to a method of capturing an image shown on a display. The invention further relates to an arrangement of an image capturing unit and of a display. The invention moreover relates to a plurality of uses of the image capturing apparatus and of the arrangement.

It has become increasingly desirable to optically capture an image shown in a display, for example on a portable apparatus, using a camera. This applies particularly to cases in which the image shown in the display contains a machine-readable optical code, for example a barcode or a data matrix.

In Japan for example a system is being utilized that allows a mobile phone user to buy drinks at a drink vending machine without cash. The mobile phone user hereby dials a number written on the drink vending machine, the mobile phone user being then sent an optical code that is shown on the display of the mobile phone. The mobile phone user holds the display of his mobile phone in front of a receiving arrangement located within the drink vending machine. The receiving arrangement hereby registers the optical code which may next be decoded. If the optical code is valid, the user is delivered the desired drink and the amount to be paid is debited with the phone bill.

Beside this concrete example, there exists a plurality of other image capturing arrangements serving to register an optical code. The majority of these image capturing arrangements operate satisfactorily as long as the optical code, as a marking, is firmly connected with a physical surface. Examples of such codes are printed codes or codes that have been burned into a surface by a laser. The apparatus operate satisfactorily as long as the physical surface is not reflective and/or as long as the physical surface has not been covered with one or a plurality of transparent protecting layers.

The majority of these arrangements however fail to operate properly when the image is captured from markings applied to specular reflecting surfaces, from markings disposed behind a glass pane and when the image is captured from markings shown in an electronic display. The majority of these arrangements more particularly fail to operate when they are to read from a liquid crystal display (LCD). This is due on the one side to the fact that the majority of the displays for showing an image are optimized for a human user and on the other side to the fact that the physical surface of the display reflects incident light or that a protecting layer disposed in front of a display reflects incident light, this light reflection negatively affecting the image capturing process.

In order however to achieve a required minimum contrast and a required minimum sharpness when capturing an image for correct optical code registration, a lighting condition is needed in most of the application cases in which the light is frontally incident on the display. The transparent layers disposed on or in front of the display already mentioned herein above in particular cause reflections that are also directly incident on the image capturing unit, thus being superimposed upon the actual image to be captured by the image capturing unit.

Such type layers are for example the top cover layer of the actual LCD, a possibly existing touchscreen foil—often utilized for pocket PCs, PDAs, smart phones and communicators—and if applicable an upper protective glass for protecting the LCD from mechanical stresses. More specifically, the upper protective glass is particularly problematic in terms of a good image capture of an image shown in a display because it is made in most cases from a simple plastic material of a poor optical quality on the one side and is on the other side often configured to be very thick so as to be capable of performing its protective function particularly well. Moreover, the top protective glass is often curved so that the light rays that are incident on the curved protective glass are reflected to many sides.

Generally, the reflections of lighting can only be reduced or avoided with difficulty. In order however to reduce the negative influences of these reflections onto a captured image, known image capturing arrangements are often provided with a very uniform diffuse lighting environment. Ideally, this lighting eliminates almost all of the artefacts in the image caused by lighting. This only provides a uniform general brightening to the image and, as a result thereof, diminishes image contrast.

Accordingly, prior art arrangements for capturing images from an LCD consist of a camera the optical axis of which coincides with the normal of the display and of a coaxial lighting device that provides homogeneous diffuse light to the display from the front. Moreover, physical light sources used for this purpose are not allowed to be located in the light path of the image capturing camera in order for them not to partially cover the image. It also makes little sense to dispose the light sources behind the camera since the camera would then be disposed between the light source and the display and the display at least partially be masked by the camera. With regard to the known image capturing arrangements, a virtual light source realized by means of a semi-transmitting mirror is being used in the light path as the lighting device.

Similar image capturing arrangements are also utilized to capture an image from a specular reflecting surface or if the area to be captured is covered by one or several transparent layers so that the specular reflecting surface and/or the interface of the translucent layers act like a mirror. As a result, the image capturing unit "sees" mirror images of the surrounding image capturing arrangement that are superimposed upon the image to be captured. In order to reduce these disadvantages, it is preferred to use a coaxial lighting device emitting a homogeneous diffuse light. A major disadvantage of this arrangement resides in the high cost of lighting devices of such a complex construction. Another disadvantage of the known arrangements moreover resides in a non-ideal homogeneity of the illumination that is directly reflected in the LCD, the protective glass or another surface capable of reflecting light. Another disadvantage is that frontal illumination almost always involves reduced contrast, which on the one side restricts the achievable image quality and on the other side makes it considerably more difficult to automatically register correctly an optical code in the image.

Furthermore, what are termed diffusers are to be utilized in order to achieve the required homogeneity so that a great part of the generated light energy is absorbed and accordingly converted to heat. Conventional lighting devices accordingly exhibit a poor efficiency because a large amount of electrical energy is needed which is for its major part converted to heat.

It is the object of the invention to provide an apparatus and an arrangement respectively that largely avoid the disadvantages of conventional image capturing arrangements.

The object of the invention is solved by an image capturing apparatus having an image capturing unit and an image fitting surface in which the optical axis of the image capturing unit is disposed at an angle α to a normal of the image fitting surface.

With the image capturing apparatus of the invention, a particularly low cost possibility is provided on the one side to capture from a specular reflecting surface and/or from areas that are covered by transparent layers images that exhibit high quality contrast and sharpness. It is thereby particularly advantageous that, on the other side, a high quality image can be captured from a display, more specifically from an LC-display.

This is particularly advantageous because the number of portable electronic apparatus equipped with a display is constantly increasing on the one side and because on the other side an ever increasing number of portable electronic apparatus having such type displays is being invented by means of which the data are presented to the user in a visual form. This applies in particular to mobile telecommunication apparatus and to electronic pocket computers. For example, higher resolution graphics-capable displays—with in parts several ten thousand pixel—have established themselves over line-oriented alphanumerical displays in mobile phones. The display technology utilized in most of the apparatus still is the liquid crystal—LC technology, which has substantially developed in the last thirty years. Moreover, pocket personal computers and PDAs for example have always been provided with graphics displays. Meanwhile, add-on modules for pocket personal computers and PDAs exist which permit, in addition to their initial purpose of utilization, the use of these apparatus as a mobile phone. Hybrid forms of pocket personal computers, PDAs and mobile phones also exist in the meantime. These hybrid forms are often called smart phones or communicators. Hereto before, such type liquid crystal displays are also used in pocket personal computers, PDAs, smart phones and communicators.

The term "image capturing unit" is to be construed herein as any device that is suited for digitally capturing an image. It is generally meant to include devices comprising a digital image capturing sensor. Such an image capturing unit may furthermore also comprise an optical device such as a lens and an objective for example. The optical device thereby substantially serves to project onto the image capturing sensor an image of the scene "viewed" by the image capturing unit.

The term "image fitting surface" is to be construed as a transparent device against which an image to be captured is fitted or at least in front of which said image is positioned, said image being preferably reproduced on a display or on a specular reflecting surface. In most of the application cases, the image fitting surface concurrently serves as a positioning aid for readily and accurately positioning the image to be captured relative to the image capturing unit. There is no concern as to whether the image to be captured is brought near the image capturing apparatus or whether the image capturing apparatus is brought near the image to be captured.

The image fitting surface is preferably configured to be planar and to be a constituent part of the housing of an image capturing apparatus. It is advantageously made from a glare-reducing material such as for example an anti-reflection glass. In addition to a preferred "physically" present image, embodiment examples may exist in which the image fitting surface is formed directly by a positioning aid. The positioning aid for example comprises a frame onto which a display is positioned opposite the image capturing unit. The frame thereby surrounds a "virtual" area representing an image fitting surface in accordance with the invention.

The term "optical axis" describes herein the main viewing direction of the image capturing unit. The main viewing direction thereby generally coincides with an axis of symmetry of the optical device, such as a lens or an objective, of the image capturing unit. In accordance with the invention the optical axis constitutes a viewing direction of the image capturing unit and is subject to the laws of ray optics. In this context it is understood that the optical axis of the image capturing unit may be broken or deviated by optical elements such as lenses, prisms or mirrors.

In accordance with the invention, the optical axis is further inclined at an angle α to the normal of the image fitting surface and passes in the simplest case between the image capturing unit and the image fitting surface. If however the optical axis of the image capturing unit is deviated by an optical device and the central light path is only incident upon the image fitting surface as a result of this deviation, the optical axis of the image capturing unit is also inclined at an angle α to the normal of the image fitting surface in the region between the optical device and the image fitting surface.

The term "normal" refers to an imaginary line that is perpendicular to the image fitting surface. In accordance with the invention, the normal preferably passes through a point in which the optical axis is incident upon the image fitting surface or upon a display brought in front of the image capturing unit.

The term "display" is meant to include, in addition to a plurality of developed implementations of LCDs such as supertwisted nematic (STN), fast supertwisted nematic (FSTN), thin film diode (TFD), thin film transistor (TFT), low-temperature poly-silicone (LTPS), other display technologies that do not make use of liquid crystals but for example of electroluminescent materials. Nearly all of the actual, and probably all of the future displays comprise a transparent "protective glass" that covers the imaging display area and protects the delicate parts of the display from mechanical stresses and from dirt. Such type protective glass is often made from a transparent plastic material and not so often from a mineral glass. Also, almost all of the displays share the primary purpose to create an image that is readily visible to a user when viewed directly.

In accordance with the present invention, the term "display" is not only meant to include a digital data display but also specular reflecting information-carrying surfaces. Generally, the term "display" includes any surface of an object that carries readable information in accordance with the invention. There is no concern as to whether these surfaces are additionally covered by one or a plurality of transparent protective layers. It is understood that far less complicated information receiving areas are included in the term display so that it is possible to capture images from almost any information-containing area in accordance with the invention.

Due to the fact that the normal is disposed at an angle α to the optical axis of the image capturing unit, the image capturing unit is disposed opposite the image fitting surface and, as a result thereof opposite a display, in such a manner that light rays incident upon the image fitting surface or upon the display are not, or to a negligible extent only, sensed or "seen" by the image capturing unit in the event of a reflection.

Accordingly, reflections originating from the image fitting surface or from a display have no negative effects onto the image captured. Accordingly, the image capturing apparatus of the invention permits to capture images of a higher quality than with the conventional image capturing arrangements in which the normal and the optical axis are oriented parallel to each other.

Furthermore, the image capturing apparatus of the invention permits to capture sharper images with improved contrast, more specifically images from the displays of portable apparatus, preferably from LCDs, even if the LCD strongly reflects incident light or if the LCD is covered by one or a plurality of transparent specular reflecting layers that strongly reflect the incident light.

Under such adverse conditions, the image capturing apparatus of the invention provides substantial advantages over known image capturing arrangements in terms of readability of optical codes from a display.

The term "optical code"—also referred to as "2D code" herein after—includes, with regard to the present invention, any information-carrying marking the information of which is readable by machine-visible means such as a digital capturing sensor. Such a code is meant to be what is termed a "character" marking which is also known by the name of "OCR".

Moreover, by arranging an angle $\alpha$ between the optical axis of the image capturing unit and the normal of the image fitting surface, it is possible to use a lighting device manufactured at low cost. This is made possible by arranging the lighting device within the image capturing apparatus in such a manner that the actually unavoidable reflections of the lighting device upon the display and/or upon a protective glass are located outside of the lens coverage area of the image capturing unit.

It is known that displays relying on an LCD-technology in particular possess an angle-dependent characteristic with regard to their readability. Substantial parameters such as contrast and sharpness strongly depend on the viewing angle of the LCDs. This particularly applies to reflective LCDs without background lighting which are mainly utilized in portable apparatus. Nearly any LCD has an optimal viewing angle at which high contrast, good sharpness and additionally, in the case of color displays, good color fidelity are obtained. This however means that, if the actual viewing angle differs too much from the optimum viewing angle, the display is no longer readable, or only with great difficulty. The tolerable difference from the optimum viewing angle is very little with portable apparatus in particular and is in most cases no more than plus/minus some 10°. In conventional use of a portable apparatus, this is no disadvantage because the user holds the apparatus in his hand and intuitively adjusts the appropriate viewing angle. To allow convenient operation of such a portable apparatus, the LCDs of portable apparatus are generally constructed such that the optimum viewing direction does not extend along the normal of the display but is in most cases inclined at an angle of about 15° to 20° to the normal.

It is therefore advantageous if the angle $\alpha$ between the optical axis of the image capturing unit and the normal of the image fitting surface is more than 2°, preferably more than 5°.

In order to achieve a captured image of the best possible quality, it is advantageous if the angle $\alpha$ is less than 50° or less than 35°, preferably less than 30°.

An objective is to achieve the least possible loss of contrast and sharpness in the largest possible region of the image fitting surface. It is therefore advantageous if the image capturing unit has an angle of sight $\beta$ of less than 30°, preferably of less than 15°. As a result, the largest possible number of optical rays is oriented in the direction of the optical axis, departing therefrom only a little with accordingly little loss of contrast and sharpness. This is due to the fact that an image is only captured in the center of a lens coverage area of an image capturing unit i.e., substantially in a region along the optical axis, exactly at the angle $\alpha$ so that the image capture is well performed. On the borders of the lens coverage area however, the effective capturing direction departs by about half the angle of sight from the optical axis of the image capturing unit. The angle of sight $\beta$ is substantially determined by the focal length of the image capturing unit. Using a long focal length results in a small angle of sight $\beta$; using a short focal length, the angle of sight $\beta$ is large. Accordingly, in order to avoid the detrimental effects of a large angle of sight $\beta$, it is advantageous to use a long focal length. The focal length of the image capturing unit is to be considered long in accordance with the invention if it is at least as long as double the length of the sensor of the image capturing unit. Accordingly, it is advantageous if the image capturing unit has a focal length that is more than double, preferably more than four times, the size of the maximum diagonal of an image capturing sensor of the image capturing unit.

Particularly good image capture quality is achieved if the angle $\alpha$ is at least half the size of the angle of sight $\beta$ of the image capturing unit, preferably if it is at least as large as the angle of sight $\beta$ of the image capturing unit. The focal length is hereby advantageously chosen so as to prevent reflection of the image capturing unit on the image fitting surface, which would result in a considerably reduced quality of the image captured.

In order to allow compact construction of the image capturing apparatus also with a focal length chosen to be very long, it is advantageous to dispose between the image capturing unit and the image fitting surface an optical device by means of which the light paths between the image capturing unit and the image fitting surface can be advantageously redirected.

Advantageously, the optical device is hereby a mirror by means of which the light paths between the image fitting surface and the image capturing unit can be very easily redirected in terms of construction.

It has been found out that it is advantageous to provide controlled lighting to a display to be read, more specifically if said display is reflective, or to a specular reflecting surface that is to be read, in order to thus achieve improved capturing results. It is therefore advantageous if the image capturing apparatus comprises a lighting device. It is understood that by redirecting the light paths the optical axis is redirected as well so that the angle $\alpha$ is meant to refer to the angle at which the possibly redirected optical axis is formed to the normal of the image fitting surface on the site of the image fitting surface.

In this context it is advantageous if the lighting device comprises light-emitting diodes since light-emitting diodes are manufacturable at a low cost, are of a small construction, operate at a low voltage, generate but little waste heat and have a very long life span.

It is further advantageous if the light emitted by the lighting device travels substantially along the light path of the image capturing unit. By thus arranging the light-emitting means, the emitted light beams are incident upon the image fitting surface or upon a display to be read at about the same angle at which the light path of the image capturing unit is inclined and at which the display is "seen" by the image capturing unit. As a result thereof, as compared to light which would otherwise be incident at another angle, the contrast and sharpness of the image captured is less reduced.

More specifically, by arranging the optical axis relative to a normal of the image fitting surface and by selecting an image capturing unit with a long focal length, one achieves that neither the image capturing unit nor the lighting means of the lighting device are reflected by a surface to be read. For this reason, an expensive homogeneous coaxial lighting device providing light to the display by a virtual light source can be excluded. Accordingly, the image capturing apparatus is an economically very interesting alternative to conventional image capturing arrangements.

In another implementation variant the lighting device comprises colored light-emitting means, preferably colored light-emitting diodes.

In order to prevent ambient light or stray light from being incident upon the image fitting surface and from being reflected in part or in whole by said image fitting surface into the image capturing unit, it is advantageous if the image capturing apparatus comprises an optical screen that is disposed outside of the light path of the image capturing apparatus. In order for the optical screen to optimally serve its purpose, it is advantageous to have the optical screen disposed between the image fitting surface and the image capturing unit and/or a lighting device.

It is particularly advantageous if the optical screen comprises a light-absorbing surface and if the light-absorbing surface is preferably turned toward the image fitting surface. The light-absorbing surface is thereby preferably black. Such a light-absorbing surface is advantageous because it is reflected in the image fitting surface or in the display or in the protective glass of a display and because the mirror image is superimposed on the image actually to be captured by the image capturing unit. The light-absorbing surface hereby however merely generates a black mirror image which, by being superimposed on the image fitting surface, has no detrimental effect on the quality of the image captured.

It is further advantageous if the image capturing apparatus comprises a housing portions of which preferably comprise a translucent material. The primary advantage of such a housing is that it protects the component parts and devices mentioned herein above from external physical, more specifically mechanical, optical and/or electrical, influences. A particular advantage is achieved if parts of the housing are made from a light-impervious material and other parts of the housing from a translucent material. It is particularly advantageous to configure the part of the housing located in the light path of the optical arrangement, for example the image fitting surface, as a window made from a reflection-reducing material. As a result, reflections on the interfaces of the window or of the image fitting surface will not impair the quality of the captured image.

It is further advantageous if the image capturing apparatus comprises a positioning device. The use of the apparatus according to its purpose of utilization is facilitated if the side of the housing that lies in the light path of the optical arrangement is equipped with a positioning device or is configured to be a positioning aid. At its simplest, the positioning device consists of a planar surface that is held in front of the display or against which the display is pressed. As a result, it is advantageous to configure the image fitting surface as a positioning device or at least to mount such a positioning device in proximity to the image fitting surface.

It is particularly advantageous if the positioning device includes a means for protecting a display or an apparatus containing said display. A padding made from a resilient material disposed around the image fitting surface for example serves to prevent the apparatus held directly in front of the window or of the fitting surface from being damaged.

Another advantage is that such a padding permits to avoid that extraneous light is laterally incident on a display when the user slightly presses the display of the apparatus against the padding of the positioning device.

Accordingly, it is advantageous if the positioning device comprises a padding that protects from damage an object brought to the positioning device and that further, in cooperation with the object, shields from ambient light the image capturing unit.

A display pressed against the positioning device or a specular reflecting surface pressed against the positioning device is thus advantageously shielded from ambient light.

The object of the invention is also solved by a method for capturing an image shown in a display by which an image capturing unit is held obliquely relative to the display during the image capturing process. By holding the image capturing device "obliquely" relative to the display, the display is held at an angle to an image capturing unit that corresponds, or at least comes very close, to the optimum viewing angle of an LC display for example. As a result, the image capture quality of the image shown in the display is substantially improved over conventional image capturing methods.

In the present context, the term "display" also includes, as already explained herein above, specular reflecting surfaces. In connection with such type surfaces, it is advantageous if the beams that are reflected from the display and lie in the light path of the image capturing unit are absorbed by an optical screen.

The method of the invention permits to use much simpler lighting devices for illuminating a display than hereto before so that the method is substantially simplified over known image capturing methods.

In order to make the method less sensitive to stray light, it is advantageous to substantially place the display on an image fitting surface or vice versa. This permits on the one side to largely prevent ambient light from being incident on the display so that the ambient light does not reach the display or only with difficulty and is not reflected from the display. This prevents image capture of the image capturing unit from being possibly disturbed. On the other side, good positioning of the image to be captured relative to the image capturing unit or vice versa is achieved.

Particularly good image capture results are obtained if during the image capturing process the display is illuminated by light having a wavelength of between 450 nm, preferably between 500 nm, and 600 nm, preferably 550 nm.

It has hereby been found out that it is advantageous if the display is illuminated by light beams that are substantially oriented along the light path of the image capturing unit. By thus illuminating the display along the light path of the image capturing unit, the light is caused to be incident on the display at substantially the same angle at which the display is "seen" by the image capturing unit. This offers the advantage that contrast and sharpness of the captured image are not reduced as this is the case when the display is illuminated at another angle.

If, in a method variant, a "physical" image fitting surface is not provided, the optical axis forcibly extends between a display and an image capturing unit or an optical device.

The invention is further solved by an arrangement consisting of an image capturing unit and a display in which the optical axis of the image capturing unit is disposed at an angle $\alpha$ to a normal of the display. The advantages of such an arrangement have already been discussed in connection with the image capturing apparatus of the invention. The difference compared to the image capturing apparatus is that the arrangement of the invention can dispense with a housing. A low cost alternative is thus obtained. Due to the open build of the arrangement of the invention, it is however advantageous to limit its use to automated stationary operation. For example, displays or other specular reflecting surfaces are automatedly brought to the image capturing unit of the arrangement of the invention. Or, the arrangement is mounted into an already existing device.

Moreover, the use of the image capturing apparatus described and the use of the arrangement for capturing an image from a display, more specifically from an LC-display or from a specular reflecting surface, is advantageous.

More specifically, the use of the image capturing apparatus and the use of the arrangement described are particularly advantageous to capture an image from a surface that is covered by at least one transparent layer.

The use of the image capturing apparatus and the use of the arrangement described is advantageous for reading an optical code that is preferably displayed on a display or on a specular reflecting surface.

For example, in the field of drink packages, the surfaces are normally bright, meaning specular reflecting. Further examples of specular reflecting surfaces are PET bottles, glass bottles, drink cans made from tin and drink boxes as well as humidity-resistant labels.

The invention described herein is particularly suited for reading markings on cans and bottles. The introduction of a deposit system for disposable packages requires the packages for which a deposit has to be paid to be provided with a marking so that the packages for which a deposit was paid—deposit paid—may be distinguished from those for which no deposit was paid—no deposit paid—.

It is advantageous if this marking includes additional information such as e.g., information on the deposit amount, the material, the manufacturer and/or the bottler because this additional information facilitates or even actually makes it possible to balance the cash flow—deposit clearing. Such a balance is more specifically necessary if the package is returned at a different place from where it has been bought. It may even be advantageous to provide each package on which there is a deposit with a clear identification code and to keep the information on the various packages in a data bank.

Another advantage is achieved if the deposit marking is scannable or readable by an automated process. A marking that would be scanned or read by humans only and not by machines would impair or hinder the automation-assisted return of the packages and would add tremendous logistical expense to the deposit clearing process.

It is therefore advantageous if the deposit marking includes an optical code, for example a data matrix code that is readable by a reader. The invention is advantageously suited for reading such type deposit marks, more specifically also with regard to cylindrical bright or round bright surfaces.

Another application is in the field of mobile tickets or of an access control to a closed area. Tickets for major events such as concerts, sport events may be ordered by mail, more specifically on the internet. The advantages associated therewith are well-known. Hereto before, tickets thus ordered have been delivered by mail in the form of material tickets so that a number of days must separate the selling of the tickets from the actual event. An electronic ticket in the form of an optical code may be used instead of a material ticket, said optical code being adapted to be displayed on a current mobile phone display. Such an electronic ticket can be sent via wireless transmission without loss of time. This makes it possible to buy tickets for example from home, shortly before the beginning of the event, which is otherwise only possible at the box office.

Moreover, code readers of the invention may be used for reading for example a 2D-code at event entrance. The scanned code is verified to check whether the code represents a valid ticket. Upon successful verification, access to the event is granted. It may hereby be advantageous if the code reader comprises signalling means such as an acoustic sound signal, an optical display or an electrical wirebound or wireless output signalling the validity of the ticket. Signalling via an electrical wirebound or wireless output is particularly advantageous if the access system comprises a corresponding electrical wirebound or wireless input. The code reader may then notify the access system that the ticket is valid upon which the access system opens an automatic door for example.

It is also possible to use code readers at another location than at the event entrance. In this context, it is advantageous if the code reader comprises a printer or is connected to a printer. With such a code reader it would be possible to exchange the electronic ticket displayed on the mobile phone display for a printed ticket. Then, access could be granted at the event entrance upon presentation of the printed ticket.

In this case it is not the 2D code that acts as the actual ticket but its content. It is therefore of no concern whether a 2D code is sent in a graphics format e.g., MMS or whether the code content only is sent and is converted into a 2D code by a program running in the mobile phone prior to being displayed on the display.

It would also be possible to transport the code content in another manner than by representing it on the display and to transport an image capture through the reader to the access system e.g., using an infrared interface or via SMS. Passing through the phone display however is advantageous because this way results in the least expense to the phone user.

Further applications are in the field of digital coupons on a mobile phone. The majority of mobile phone users only accept advertising messages on their mobile phone if they offer direct advantages to the user. In order to win this range of users for these advertising messages, it is necessary to grant the users of the advertising service advantages they would not have if they did not use the service.

For this purpose, it seems appropriate to send to the users tolerating advertising messages on their mobile phone, together with said advertising messages, electronic coupons that can be redeemed within a certain period of time in determined shops such as cinemas, theaters, and so on. A coupon may for example grant special discounts, promise extras or small presents.

The advantage of this type of advertising is the improved efficiency. On the one side, the required declaration of consent of the user implies that the advertisement will match the target group. On the other side, future localisation services permit to adapt the sending of advertising messages to the whereabouts of the user.

The difficulty of redeeming electronic coupons stored in the mobile phone for example, meaning to "retrieve" them from the mobile phone, is solved by using a 2D code as a coupon and by using a reader of the invention at the site of redemption. It is for example possible to equip each counter of a participating department store with a reader. It is thereby advantageous if the reader is connected to the counter through connection means. This applies in particular to discount coupons. Such a connection permits to readily transmit the coupon to the counter system, thus avoiding subsequent manual booking of the coupons.

Precisely in the introductory phase however it is also possible to only install one reader or but a few readers on central locations in the department store. Together with a printer, said reader is integrated into a readily operable apparatus. The user holds the mobile phone with the 2D code in front of the reader and receives in return a "physical" coupon he may then redeem at a counter. It is thereby advantageous if the physical coupon comprises a barcode that may be read by the counter and be processed by the counter system. The particular advantage of this way of proceeding is that the counter sales personnel is capable of processing these physical coupons in much the same way as conventional coupons that are for example printed in newspaper supplements. Ideally, the counter sales personnel needs not receive complicated extra training.

Once the 2D code has been read and used in the system, for example for printing a "physical" coupon, the 2D code or the information of the 2D code is deactivated so that the code can only be used once. If however, the code is to be used several times, it may remain active for an appropriately longer period of time.

Further objects, advantages and features of the present invention will become more apparent upon reading the description of the attached drawing that illustrates, by way of example, the arrangement of the invention and the image capturing apparatus of the invention.

For the purposes of clarity, like elements or components will bear the same reference numerals.

In the drawing

Figure 8:
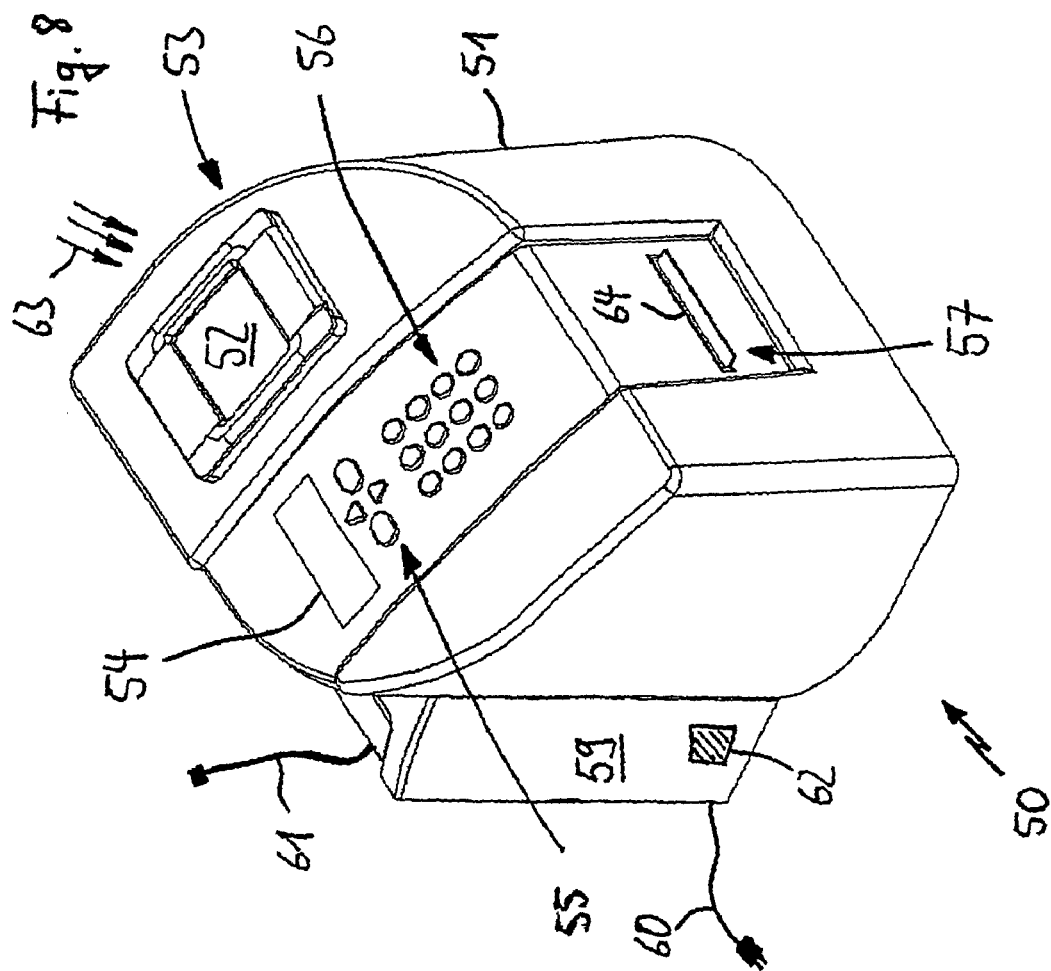

FIG. 1 is a schematic view of an image capturing arrangement of the invention, FIGS. 2 and 3 each are a schematic view of an image capturing arrangement with an optical screen, FIG. 4 is a perspective view of a code reader, FIGS. 5 and 6 each are a perspective view of a code reader in cooperation with a mobile phone, FIG. 7 is a schematic side view of the code reader of the FIGS. 4 to 6 with an image capturing arrangement of the invention, FIG. 8 is a schematic view of another code reader with a control panel, a display and a keyboard and FIG. 9 is an exemplary embodiment of a coupon that has been issued by means of the code reader of FIG. 8.

The exemplary embodiment shown in FIG. 1 includes an image capturing unit 1 that is disposed opposite a display 2 of a pocket personal computer 3. The image capturing unit 1 has a light path 4 with an angle of sight β. The image capturing unit 1 is thereby disposed opposite the display 2 in such a manner that the light path 4 almost completely covers the display 2 so that the image capturing unit 1 completely "sees" an image 5 shown by the display 2.

The image capturing unit 1 has an optical axis 6 that is inclined at an angle α to a normal 7.

The normal 7 is perpendicular to the display 2 and passes through a point of intersection 8 in which the optical axis 6 meets the display 2.

If the display 2 is partially reflective or if the display 2 is covered by partially reflective transparent layers 32 (see FIG. 7), the image captured by the image capturing unit 1 is composed of the image of the display 2 or of the image 5 shown in the display 2 and of an image of the reflections (not shown). In a conventional arrangement in which the optical axis 6 of the image capturing unit 1 coincides with the normal 7, the image capturing unit 1 is at least partially reflected in the display 2 or in the layers superimposed on the display 2, so that the image captured by the image capturing unit 1 contains the mirror image of the image capturing unit 1.

In the arrangement 1 of the invention as shown in FIG. 1, the image capturing unit 1 does not "see" itself in the mirror image but "looks" past its own mirror image. Instead, the image capturing unit 1 "sees" the mirror image of a region 9 of the scene located to the side of the image capturing unit 1. A particular advantage thereby is that a region 9A, in which the image capturing unit 1 is disposed, is not used for capturing the image.

Advantageously, further structural elements for controlling reflecting effects may thus be provided in the region 9 (see for example the FIGS. 2 and 3). It is more specifically advantageous to install an optical screen 12 (see FIGS. 2 and 3) made from a light-impervious material in this freed region 9 which the image capturing unit 1 "sees" as a result of reflections.

The arrangement 10 shown in FIG. 2 includes an image capturing unit 1 for capturing an image from a specular reflecting surface 11. In this exemplary embodiment as well, the image capturing unit 1 is characterized by an optical axis 6 and by a light path 4 with an angle of sight β, with the optical axis 6 intersecting the specular reflecting surface 11 at the point of intersection 8. Taking its departure from this point of intersection 8, a normal 7 extends perpendicularly to the surface 11 and is inclined at an angle α to the optical axis 6.

Furthermore, the arrangement 10 comprises an optical screen 12 that is provided with a light-absorbing black surface 13. Reflections that might reduce image capture quality are thus prevented. The light-absorbing surface 13 appears "black" even when it is illuminated. Advantageously, no reflection that is visible to the image capturing unit 1 occurs as a result thereof.

The arrangement 14 shown in FIG. 3 comprises an image capturing unit 1 in front of a specular reflecting surface 11 with an optical screen 12. It is advantageous to keep zone 15, which is indicated here by hatched lines, free from light sources since light sources disposed in this zone 15 would cause deleterious reflections in the captured image. Moreover, the hatched zone 15 is also the only zone from which light beams are reflected onto the specular reflecting surface 11 and, as a result thereof, into the image capturing unit 1.

The arrangement 14 of the invention described herein allows for a high degree of freedom for constructing the same. More specifically, additional lighting devices 39 (see FIG. 7) may be mounted almost anywhere within the image capturing arrangement 14 without causing disturbing reflections on the specular reflecting surface 11. Another advantage is the considerably improved tolerance to externally incident extraneous light.

The code reader 16 shown in the FIGS. 4 to 6 includes the functioning principle of the arrangements 10 and 14 of the invention described in the FIGS. 1 to 3. The code reader 16 includes a housing 17 providing outstanding protection against external influences.

The front side 18 of the code reader 16 is partially made from an anti-reflection glass window 19. The remaining part of side 18 at least partially includes a positioning aid 20. The code reader 16 further comprises mechanical fastening means 21 and 22 as well as electrical connection means 23.

The mechanical fastening means 21 and 22, which are implemented here as an internal thread by way of example, permit to fasten it to other objects and to mount it into other apparatus such as vending machines or access control systems without any problem.

The electrical connection means 23 serve to supply the apparatus with electrical energy and to electronically exchange data. It is more specifically possible to send information from the code reader 16 to a peripheral unit (not shown herein) via the electrical connection means 23. Such information may for example be the image captured by the image capturing unit 1 (see for example the FIGS. 1 to 3), the content of a code decoded by the code reader 16 or status messages of the code reader 16. It is also possible to send information from the periphery to the code reader 16. As a result, it is possible to parameterize and to maintain the code reader 16 from the outside or to trigger optical and acoustical signallers 41 (see FIG. 7) contained in the code reader 16.

A mobile phone 24 (see FIGS. 5 and 6) can be disposed in front of the code reader 16. The code reader 16 is hereby used to read an optical code 25 displayed on an LCD 26 of the mobile phone 24. The vertical mounting position of an arrangement 10, 14 indicated here is particularly advantageous when the code reader 16 is used in outside areas 27 because the ambient light there is bright and is mainly radiated from the top downward. The vertical mounting position permits to prevent disturbing direct sun light 28 from being radiated onto the image capturing unit 1.

To read the code 25, the user holds the display 26 of the mobile phone 24 under the code reader 16 and in front of the window 19 of the code reader 16. The user is assisted by the positioning device 20 so that, by placing the mobile phone 24 against the positioning device 20, an advantageous angle between the LCD 26 and the optical axis 6 of the image capturing unit 1 is automatically obtained. During reading of the code 25, the code content is transmitted via the electrical connection means 23 to a superior system (not shown herein) that takes over the further processing of the code content.

In order to further facilitate positioning, the side 29 that is turned toward the user comprises another transparent zone 30. Through this zone 30, the user sees the LCD 26 of the mobile phone 24. This substantially facilitates positioning. Finally, positioning may be further assisted by acoustical and optical signalling that delivers a check-back signal to the user as soon as the optical code 25 to be read has been read. This signalling may thereby occur either directly on or in the code reader 16 or through a superior system (not shown herein) that communicates with the code reader 16 via the connection means 23. In conventional arrangements, another transparent zone 30 would have deleterious effects onto the quality of the captured image because extraneous light being externally incident through this opening would be reflected from the display 26 into the image capturing unit 1 (see FIGS. 1 to 3). In the present arrangement, by contrast, light being possibly externally incident through the transparent zone 30 is reflected from the display 26 onto the light-absorbing surface 13 of the optical screen 12 only (see FIGS. 2 and 3) where it is absorbed and thus rendered harmless to image capture.

In the code reader 16, an image capturing unit 1 is spaced opposite an image fitting surface 31. The image capturing unit 1 receives the code 25 of the LCD 26. The LCD 26 is hereby protected by a protective glass 32 of the mobile phone 24.

Using a small angle of sight β for the image capturing unit 1 is advantageous for capturing an image but results in a large build of the code reader 16. In order to keep the build of the code reader 16 small, the light path 4 of the image capturing unit 1 is redirected by a mirror 33. This makes it possible to arrange the image capturing unit 1 together with other structural elements of the code reader 16. For example, an image processing unit 34 and a connection unit 35 as well as a signaller 41 are disposed in a free zone 36 behind the optical screen 12.

Another advantage of redirecting the light path 4 by a mirror 33 is that almost all of the components may be mounted at right angles in a rectangular housing 17, which considerably reduces construction expense. Only the mirror 33 and the optical screen 12 need oblique-angled fasteners 37 and 38. It is particularly advantageous if the mirror 33 and the optical screen 12 are mounted during manufacturing of the housing 17 already.

The image capturing arrangement 10, 14 (see FIGS. 2 and 3) within the code reader 16 additionally comprises a lighting device 29 that comprises light-emitting diodes 14 for illuminating the LCD 26. The light-emitting diodes 40 are thereby disposed in immediate proximity to the image capturing unit 1 and emit light substantially in the direction of the light path 4 of the image capturing unit 1.

The arrangement of the light-emitting diodes 40 in immediate proximity to the image capturing unit 1 introduces an effect of benefit in the image capturing process. Due to the proximity to the image capturing unit 1 and to the light being emitted in the direction of the light path 4 of the image capturing unit 1, the light reflected from the LCD 26 or from a protective glass cover 32 is directed onto the optical screen 12 with the absorbing surface 13 so that it is prevented from causing deleterious effects. With LCDs 26 in particular, another advantage achieved is the improved sharpness because parallax errors are avoided through differing angles of sight and of lighting.

It may be advantageous to arrange the lighting device 39 in such a manner that the main illumination direction is slightly different from the direction of the optical axis 6 of the image capturing unit 1. This is due to the fact that not all the zones of the LCD 26 are spaced the same distance from the light-emitting means 40 so that they are illuminated at different intensities. With the code reader 16 shown in this exemplary embodiment, this effect is compensated by slightly tilting the lighting device 39 so as to obtain a uniformly illuminated LCD. In this exemplary embodiment, the light-emitting diodes emit yellow and green light. This is advantageous because many LCDs 26 have the highest contrast with a light of this color.

The code reader 16 moreover includes an acoustical signaller 41 that sends a signal that the optical code 25 is being read. The signaller 41 can be triggered directly by the code reader 16, meaning totally by itself, or via the electrical connection means 23.

The code reader 50 for reading an optical code 25 (see FIG. 6) shown in FIG. 8 comprises a housing 51 on which there are disposed a read window 52, a positioning aid 53, an optical output unit 54, a control panel 55, a keyboard 56 and a voucher printer 57, for example for issuing a coupon 58 (see FIG. 9). The code reader 50 further comprises various connection means on its rear side 59. The code reader 50 is for example provided with a connecting cable 60 through which the code reader is supplied with energy. The code reader 50 further comprises a connection terminal 61 through which it can be connected to an Ethernet. The code reader 50 further includes a Bluetooth interface 62 for establishing a wireless connection to a back office system (not shown herein). It is understood that such a wireless connection can be realized not only via a Bluetooth interface 62 but also via a GPRS or a W-Lan interface (not shown herein). Accordingly, the connection means 61 can also be realized by means of an RS232 standard. It is more specifically possible to configure, to maintain the code reader 50 and/or to interrogate statistical data from the back office system. In order to permit the reading of an optical code 25 (see FIG. 6) from a display 26 of a mobile phone 24, the LCD display 26 is held in front of the read window 52 of the code reader 50. In order to be capable of positioning a display 26 or a surface of an object comprising an optical code to be read in front of the read window 52 in a particularly easy manner, the read window 52 is framed by the positioning aid 53. In this exemplary embodiment, the positioning aid 53 is made from a relatively soft plastic material that will not damage the display 26 pressed against the positioning aid 53. Used in connection with the display 26 pressed against the read window 52, the positioning aid 53 moreover serves as a protection against ambient light 63 so that the reading of the code 25 from the display 26 is, as far as possible, not hindered by the additionally incident ambient light 63.

To the left of the read window 52 there are located the optical output unit 54, the control panel 55 and the keyboard 56. User tips and status messages such as "please place the display of your mobile phone onto the read window", "please enter your pin in on the keyboard", "invalid ticket", "please wait, your coupon is being printed", "coupon already redeemed", "no paper", "out of order" can be displayed at the optical output unit 54.

Authorization data, a pin for example, can, be entered in on keyboard 56. The operating personnel can program the code reader 50 to a determined application mode, using the keyboard 56. It is hereby advantageous if the operating personnel first have to get the authorization at the code reader 50. This may for example occur by entering a system PIN in on the keyboard 56 or through an optical code via the read window 52. For example, the code reader 50 is configured by the operating personnel according to a menu by means of the keyboard 56 and the optical output unit 54—in a way similar to that currently used with mobile phones.

With the voucher printer 57, a physical coupon 58 or another ticket is printed. The coupon 58 is hereby issued from the code reader 50 through an output slot 64 of the voucher printer 57.

The coupon 58 (see FIG. 9) issued in this exemplary embodiment comprises, in addition to a description of how to use the coupon, a barcode 66. The barcode 66 may for example be scanned at a counter (not shown herein) together with a product to be purchased (nor shown herein) so that the counter system deduces the credit of the coupon 58 from the price of the product.

It is understood that the code readers 16 and 50 described herein above as well as the arrangements described in connection with the invention are only first exemplary embodiments of the present invention and are not intended to limit the scope of the invention in any manner.

The invention claimed is:

1. An image capturing apparatus for capturing images of portable objects (16) with an image capturing unit (1) and an image fitting surface (31) in which the optical axis (6) of the image capturing unit (1) passes from said image capturing unit (1) through the image fitting surface (31) to the image, wherein the image capturing unit is disposed so that the optical axis (6) of the image capturing unit (1) is inclined at an angle α of more than 5° with respect to a normal (7) of the image fitting surface (31) in a region in which the optical axis traverses the image fitting surface (31) and further comprising a screen in a region of the image fitting surface, said screen being made from a light-impervious material and which prevents ambient light or stray light from being incident upon the image fitting surface.

2. The image capturing apparatus (16) as set forth in claim 1, wherein the angle α is less than 30°.

3. The image capturing apparatus (16) as set forth in claim 1, wherein the image capturing unit (1) comprises an angle of sight β of less than 30°.

4. The image capturing apparatus (16) as set forth in claim 1, wherein the image capturing unit (1) comprises a focal length that is more than double the size of the maximum diagonal of an image capturing sensor of the image capturing unit (1).

5. The image capturing apparatus (16) as set forth in claim 1, wherein the angle α is at least half the size of the angle of sight β of the image capturing unit (1).

6. The image capturing apparatus (16) as set forth in claim 1, wherein an optical device (33) is disposed between the image capturing unit (1) and the image fitting surface (31) so that the optical device is positioned in an optical capture path.

7. The image capturing apparatus (16) as set forth in claim 1, comprising a lighting device (39).

8. The image capturing apparatus (16) as set forth in claim 7, wherein the lighting device (39) comprises light-emitting diodes (40) as the light-emitting means.

9. The image capturing apparatus (16) as set forth in claim 8, wherein the light-emitting means are disposed in immediate proximity to the image capturing unit (1).

10. The image capturing apparatus (16) as set forth in claim 7, wherein the lighting device (39) comprises colored light-emitting means.

11. The image capturing apparatus (16) as set forth in claim 1, wherein the screen (12) is disposed outside of a light path (4) of the image capturing unit (1).

12. The image capturing apparatus (16) as set forth in claim 11, wherein the optical screen (12) is disposed between the image fitting surface (31) and the image capturing unit (1) and/or a lighting device (39).

13. The image capturing apparatus (16) as set forth in claim 11, wherein the optical screen (12) comprises a light-absorbing surface (13) and that the light-absorbing surface is turned toward the image fitting surface (31).

14. The image capturing apparatus (16) as set forth in claim 1, comprising a housing (17) portions of which comprise a translucent material.

15. The image capturing apparatus (16) as set forth in claim 14, wherein the translucent material is a reflection-reducing material.

16. The image capturing apparatus according to claim 15, wherein the reflection reducing material is a translucent glass window 19.

17. The image capturing apparatus (16) as set forth in claim 1, comprising a positioning device (20) for positioning the portable object relative to the image capturing apparatus.

18. The image capturing apparatus (16) as set forth in claim 17, wherein the positioning device (20) comprises a protection means that protects an object placed on the positioning device (20) from damage and that moreover shields, together with the object, the image capturing unit (1) from ambient light (28).

19. Use of an image capturing apparatus (16) as set forth in claim 1 and/or use of an arrangement (10; 14) for capturing an image from a display (2), more specifically from an LC-display (26) or from a specular reflecting surface (11).

20. Use of an image capturing apparatus (16) as set forth in claim 1 and/or use of an arrangement (10; 14) for capturing an image from a surface that is covered by at least one transparent layer (32).

21. Use of an image capturing apparatus (16) as set forth in claim 1 and/or use of an arrangement (10; 14) for reading an optical code (25) that is preferably displayed on a display (2; 26) or on a specular reflecting surface (11).

22. Use of an image according to claim 21, for the reading of an optical code that is located completely in the visual field of the image capturing unit.

* * * * *